(12) United States Patent
Yamamoto

(10) Patent No.: US 7,242,503 B2
(45) Date of Patent: Jul. 10, 2007

(54) IMAGE READING METHOD

(75) Inventor: Hiroyasu Yamamoto, Kanagawa (JP)

(73) Assignee: FujiFilm Corporation, Tokyo (JP)

( * ) Notice: Subject to any disclaimer, the term of this patent is extended or adjusted under 35 U.S.C. 154(b) by 1151 days.

(21) Appl. No.: 09/739,666

(22) Filed: Dec. 20, 2000

(65) Prior Publication Data

US 2002/0051214 A1 May 2, 2002

(30) Foreign Application Priority Data

Dec. 20, 1999 (JP) .............................. 11-360610

(51) Int. Cl.
*H04N 1/04* (2006.01)
*H04N 1/46* (2006.01)

(52) U.S. Cl. ..................... 358/487; 358/506; 358/488; 358/496; 358/498

(58) Field of Classification Search ................ 358/487, 358/506, 496, 498, 474, 505, 486, 488; 382/318, 382/319, 312; 355/407, 40; 399/367, 370, 399/371; 250/234–236; 348/96, 97
See application file for complete search history.

(56) References Cited

U.S. PATENT DOCUMENTS

| | | | | |
|---|---|---|---|---|
| 5,157,482 A | * | 10/1992 | Cosgrove | ..................... 348/97 |
| 5,369,426 A | * | 11/1994 | Jamzadeh | .................... 347/115 |
| 5,504,583 A | * | 4/1996 | Jamzadeh et al. | ........... 358/302 |
| 5,949,479 A | * | 9/1999 | Maruyama et al. | ............ 348/97 |
| 6,346,998 B2 | * | 2/2002 | Shiota et al. | ................ 358/487 |
| 6,538,717 B2 | * | 3/2003 | Nakamura et al. | ............. 355/40 |

FOREIGN PATENT DOCUMENTS

JP 11-215313 8/1999

* cited by examiner

*Primary Examiner*—Cheukfan Lee
(74) *Attorney, Agent, or Firm*—Sughrue Mion, PLLC

(57) ABSTRACT

In the image reading method, a film having images recorded in a plurality of frames in a longitudinal direction is transported to read the images photoelectrically at an image reading position by an image reading device. This method transports the film in a first direction along a read and transport path including the image reading position to perform a first image reading for reading the images by the image reading device, returns a forward end of the film to the read and transport path on an entry or exit side of the read and transport path after the first image reading has been finished, and transports the film along the read and transport path in the first direction or in a second direction opposite to the first direction to perform a second image reading in which the images are read by the image reading device at the image reading position in a sequence of frames that was applied to the first image reading.

25 Claims, 7 Drawing Sheets

IMAGE READING METHOD

BACKGROUND OF THE INVENTION

The present invention relates to an image reading method in which a film having images recorded in a plurality of frames is transported to photoelectrically read the images recorded in the film at an image reading position by an image reading device thereby obtaining output image data. More particularly, the present invention relates to a film image reading method in which, when images recorded in a plurality of frames of a film are read to obtain output image data, a prescan for previously reading the images with low resolution from the film being transported so as to pass through an image reading position is followed by a fine scan for reading the images with high resolution while transporting the film in the sequence of the frames read in the prescan.

Recently, digital photoprinters have been in practical use, in which images recorded on photographic films such as negative films, reversal films and the like (which are hereinafter referred to as "films") are printed onto light sensitive materials (photographic papers) by a printer making use of digital exposure. That is, images recorded on a film are read photoelectrically and converted into digital signals, which are subjected to various kinds of image processing to produce recording image data and a light-sensitive material is exposed by scanning with recording light modulated in accordance with the image data, thereby recording a (latent) image which is then processed photoelectrically to produce a (finished) print.

In the digital photoprinters, the image is converted to digital image data and exposing conditions in a print operation can be determined by processing the image data. Hence, by using such digital photoprinters, the correction of drop-outs or blocked-ups due to photography with rear light or an electronic flash, sharpening, the correction of color or density failures, the correction of under- or over-exposure, the correction of the deterioration of marginal luminosity and various kinds of image processing can be performed effectively enough to produce prints of high quality that have heretofore been impossible to obtain by the conventional direct exposure technique. In addition, a plurality of images can be combined into a single image or one image can be split into segments or even characters can be combined by the processing of image data. If desired, prints can be output after desired editing/processing is carried out in accordance with a specific application.

Having these features, the digital photoprinter is composed of the following three basic components; a scanner (image reading apparatus) that reads the image on a film photoelectrically; an image processing apparatus that performs image processing of the read image to produce recording image data; and a printer (image recording apparatus) that scan exposes a light-sensitive material in accordance with the image data and performs development and other necessary processes to produce a print.

In the scanner, the projected light emitted from an illuminant is permitted to be incident on a film passing through an image reading position, thereby obtaining projected light that bears the image recorded on the film; after the projected light is regulated to a slit state through a slit extending in a direction perpendicular to a direction in which the film moves, the image that is formed by an optical imaging lens is photoelectrically converted by means of a line CCD sensor including CCD elements extending in the same direction as the direction in which the slit extends, thereby reading the image. That is, the scanner slit-scans the projected light passing through the film at the image reading position while transporting the film so as to capture the image one-dimensionally by the line CCD sensor that functions as an image reading device, whereby the image recorded on the film is captured two-dimensionally.

Thereafter, a digital signal is obtained by subjecting an image signal obtained by reading the image to A/D conversion and supplied to the image processing apparatus.

In the image processing apparatus, image processing conditions are set on the basis of the image data that has been read with the scanner and image processing is applied to the image data in accordance with the thus set conditions, thereby producing output image data for image recording (i.e., exposing conditions) that is subsequently sent to the printer.

In the Printer, if it is an apparatus that utilizes exposure by scanning with optical beams, the optical beams are modulated in accordance with the image data supplied from the image processing apparatus and a latent image is formed by scan exposing (printing) the light-sensitive material two-dimensionally. Then, the light-sensitive material is subjected to predetermined development processing and the like so as to produce a finished print (photograph) reproducing the image that has been recorded on the film.

In the digital photoprinter arranged as described above, the image recorded on the film is photoelectrically read by two scans, that is, by prescan in which the image recorded on the film is read with low resolution and fine scan in which the image is read with high resolution to obtain the image data of an image to be output. From the necessity of promptly processing a lot of images, however, the prescan is carried out in such a manner that a sleeve-like film such as one roll film is taken out from a cartridge and transported and scanned, and all the frames of the images recorded on the film are read instantly without being interrupted as disclosed in Japanese Unexamined Patent Application Publication No. 11-215313. Thereafter, the image processing conditions (which also include frame position and reading conditions for fine scan, but these are typified by the image processing conditions in the following description) are set for each frame or for each group consisting of several frames in a sequence that is opposite to the sequence in which the frames were read in the prescan, that is, from the image of the finally read frame; images processed on the basis of the thus set image processing conditions are displayed on a monitor; and an operator corrects as required and determines the image processing conditions, while looking at the processed images. That is, the image processing conditions are determined by the operator and then the images are fine-scanned. In the fine scan, each frame of the film is scan read, making use of the transport of the film for rewinding the film drawn out from the film cartridge in the prescan thereinto.

A verification processing step from the setting of the image processing conditions to the determination thereof by the operator requires a relatively long time. Accordingly, it is desirable to effectively perform the verification processing step in a short time between the prescan and the fine scan from the view point of processing a lot of images effectively and promptly.

The verification processing step, in which the image processing conditions are set, the processed images are displayed on the monitor, and the image processing conditions are corrected and determined by the operator, is carried out in the sequence opposite to that of the frames read in the prescan, that is, from the image of the frame read finally in the prescan. Therefore, the image read first in the prescan is not verified and remains stored in a memory during the time in which the images of other frames are being read and further until the verification processing step for the other frames is completed, from which arises a problem in that processing steps cannot be effectively achieved.

Further, when the verification processing step is carried out from the image of the frame that is read first in the prescan, the above wait time until the verification processing step is started can be reduced. However, the fine scan cannot be carried out until the image of the final frame is read in the prescan and verified because the fine scan is started from the image of the final frame in the sequence opposite to that of the frames read in the prescan. Thus, the processing steps cannot yet be effectively achieved.

Further, there is also an idea in which the verification processing step is performed sequentially from the first frame in parallel with the prescan, the film is rewound instantly when the prescan is completed and the fine scan starts from the first frame and is sequentially carried out for the frames having been verified. In this case, it is supposed that the efficiency of the processing steps can be greatly improved because the film can be instantly rewound without waiting for the completion of the verification of the images of all the frames and the fine scan can be started from the frames having been verified.

However, the processing efficiency is reduced by a rewind time necessary to rewind the film having been drawn out in the prescan. In addition to the above, to perform the prescan and the fine scan, the film is transported three times while being drawn out and rewound, which makes the scan and transport of the film complex and further the film may be damaged.

SUMMARY OF THE INVENTION

Accordingly, it is an object of the present invention to provide an image reading method that ensures the improvement in the reading efficiency when images recorded in a plurality of frames of a film are subjected to image reading twice, in particular an image reading method capable of effectively setting image processing conditions, displaying images and correcting and determining the image processing conditions as to the images of a plurality of frames recorded on a film when the film is transported and the images thereof are read with high resolution to obtain output image data after the film is transported and the images thereof are previously read with low resolution so as to set the image processing conditions and the like and perform verification.

In order to attain the object described above, the present invention provides an image reading method in which a film having images recorded in a plurality of frames in a longitudinal direction is transported to read the images in the plurality of frames photoelectrically at an image reading position by an image reading device, comprising the steps of transporting the film in a first direction along a read and transport path including the image reading position to perform a first image reading for reading the images in the plurality of frames by the image reading device, returning a forward end of the film to the read and transport path on an entry or exit side of the read and transport path after the first image reading has been finished, and transporting the film along the read and transport path in the first direction or in a second direction opposite to the first direction to perform a second image reading in which the images in the plurality of frames are read by the image reading device at the image reading position in a sequence of frames that was applied to the first image reading.

Preferably, the first image reading is a prescan for reading the images in the plurality of frames of the film with low resolution, and the second image reading is a fine scan for reading the images in the plurality of frames of the film with high resolution.

Preferably, the first image reading is performed for determining a frame position of each of the images in the plurality of frames and reading conditions for the second image reading.

Preferably, the first image reading is performed for determining image processing conditions.

Preferably, the second image reading is performed for obtaining output image data.

Preferably, after the first image reading has been finished, the forward end of the film is held at a specified position and the film is temporarily reserved in a specified space, and the film is returned to the read and transport path on the entry or exit side of the read and transport path after all of the images in the plurality of frames of the film have been subjected to the first image reading.

Preferably, the film is transported along a loop-shaped transport path so that the forward end of the film after the first image reading has been finished can be returned to the read and transport path on the entry or exit side of the read and transport path.

Preferably, the forward end of the film after the first image reading has been finished is returned to the read and transport path on the exit side of the read and transport path and the film is transported along the read and transport path in the second direction to be subjected to the second image reading.

Preferably, in the second image reading, the images in the plurality of frames of the film are read from a film surface opposite to that subjected to the first image reading.

Preferably, the forward end of the film after the first image reading has been finished is returned to the read and transport path on the exit side of the read and transport path after film surfaces have been reversed to each other and, in the second image reading, the images in the plurality of frames of the film are read from a film surface identical to that subjected to the first image reading.

Preferably, at least one of first image data obtained by the first image reading and second image data obtained by the second image reading is subjected to at least one processing of two-face inversion processing and one-face inversion processing when it is necessary to perform the at least one processing on a film surface captured in each of the first image reading and the second image reading.

Preferably, from which surface side the film was read is detected in at least one of the first image reading and the second image reading and, depending on which surface side was detected, it is determined whether or not at least one of first image data and second image data obtained by the first image reading and the second image reading, respectively requires each of two-face inversion processing and one-face inversion processing such that at least one processing of the two-face inversion processing and the one-face inversion processing can be performed when the at least one processing is necessary.

Preferably, the first image data is not subjected to the two-face inversion processing or the one-face inversion processing and image processing conditions determined based on the first image data include information as to whether or not each of the two-face inversion processing and the one-face inversion processing is necessary so that the second image data can be subjected to the at least one processing of the two-face inversion processing and the one-face inversion processing based on the image processing conditions when the at least one processing is necessary.

Preferably, a bar code recorded in the film is extracted to acquire bar code information thereby detecting from which surface side the film was read.

Preferably, the forward end of the film after the first image reading has been finished is returned to the read and transport path on the entry side of the read and transport path and, in the second image reading, the film is transported along the read and transport path in the first direction and is read from a film surface identical to that subjected to the first image reading.

Preferably, the film is transported along a loop-shaped transport path so that the forward end of the film after the first image reading has been finished can be returned to the read and transport path on the entry side of the read and transport path.

Preferably, an optical path of projected light that reaches the image reading device from an illuminant for exposing the film is formed not so as to cross over the loop-shaped transport path when the film is photoelectrically read by the image reading device.

Preferably, the optical path of the projected light is changed in direction in mid course between the illuminant and the film.

Preferably, the optical path of the projected light is changed in direction in mid course between the film and the image reading device.

Preferably, the optical path of the projected light is straight.

Preferably, the loop-shaped transport path is formed so that the film can be twisted in mid course not to cross over the optical path of the projected light.

Preferably, in the first image reading, the first image reading is performed and in parallel, a plurality of conditions including a frame position of each of the images in the plurality of frames, reading conditions for the second image reading and image processing conditions are corrected or determined, and in correcting or determining the plurality of conditions, the plurality of conditions are not only corrected or determined but also the second image reading is performed in parallel based on the reading conditions for the second image reading that have been already determined.

In order to attain the object described above, the prevent invention provides an image reading method for obtaining output image data by transporting a film having images of a plurality of frames recorded in one direction and reading the images at an image reading position photoelectrically by an image reading device comprising the steps of transporting the film and performing a prescan for previously reading the images of the plurality of frames with low resolution at the image reading position to determine image processing conditions, transporting the film having been read at the image reading position along a loop-shaped transportation path returning to the image reading position again, and transporting the film and performing a fine scan for reading the images of the plurality of frames with high resolution at the image reading position in the sequence of the frames having been read in the prescan to thereby obtaining the output image data.

Preferably, the film having been prescanned is transported along the loop-shaped transportation path and thereafter transported in a direction of the image reading position from the prescan completion side where the film has been prescanned and transported.

Preferably, the film is read in the fine scan while being transported in a direction opposite to a direction in which the film was transported in the prescan in a state that a back surface of a film reading surface of the film which faced the image reading device in the prescan, faces the image reading device.

Preferably, the film is transported along the loop-shaped transportation path in the direction of the image reading position from the side of the film having been prescanned in a state that the film surface of the film is reversed and reads in the fine scan while transporting the film in a direction opposite to a direction in which the film was transported in the prescan in a state that the same film surface as a film surface of the film which faced the image reading device in the prescan, faces the image reading device.

Preferably, whether or not at least one of a front and back surface replacement (two-face inversion) processing and an up and down side replacement (one-face inversion) processing is necessary is determined to the image data obtained in the prescan and to the image data obtained in the fine scan in consideration of a film reading surface facing the image reading device when the film is read in the prescan and the fine scan and the at least one of the front and back surface replacement processing and the up and down side replacement processing is performed when it is determined necessary.

Preferably, any of the image recording surface of the film on which the images are recorded and the back surface of the image recording surface can be set as a film reading surface in the prescan, and whether the film reading surface facing the image reading device is the film recording surface on which the images are recorded or the back surface of the film recording surface is determined by a film front and back surface detection device, whether or not at least one of the front and back surface replacement processing and the up and down side replacement processing is necessary in the prescan and the fine scan is determined in accordance with a result of the determination and the at least one of the front and back surface replacement processing step and the up and down side replacement processing step when it is determined necessary.

Preferably, the image data obtained in the prescan is not subjected to the replacement processings, the image processing conditions determined based on the image data obtained in the prescan include information for determining whether or not the replacement processings are necessary, and the replacement processings are performed to the image data in the fine scan based on the image processing conditions.

Preferably, the film front and back surface detection device determines the front surface and the back surface of the film in the prescan and the fine scan by extracting bar codes recorded on the film and obtaining bar code information therefrom.

Preferably, the film having been subjected to the prescan is transported along the loop-shaped transportation path ranging from a prescan completion side to which the film having been prescanned is transported to a prescan start side to which the film was transported in the prescan and in the fine scan, the film is further transported in the direction of the image reading position from the prescan start side and the film in a state that the same film surface as that, which faced the image reading device, faces the image reading device while transporting the film in the direction which is same as that of the film transported in the fine scan.

Preferably, the loop-shaped transportation path is disposed apart from the light path of projected light which is projected from an illuminant for illuminating the film to the image reading device when the image reading device reads the film photoelectrically.

Preferably, the loop-shaped transportation path is disposed apart from the light path between the illuminant and the image reading device by changing the direction of the light path by reflecting the reading light illuminated from the illuminant to the film at a midpoint of the light path between the illuminant and the film.

Preferably, the loop-shaped transportation path is disposed apart from the light path between the illuminant and the image reading device by changing the direction of the light path by reflecting the projected light passing through the film for reading the film by the image reading device at a midpoint of the light path between the film and the image reading device.

Preferably, the light path of the projected light projected from the illuminant to the image reading position is straight, and the loop-shaped transportation path is kept away from the light path by twisting the film at a midpoint of the transportation path.

Preferably, the image processing conditions are corrected and determined based on the image data having been read in the prescan in parallel with the prescan and the fine scan is performed based on the image processing conditions having been determined in parallel with the correction or the determination of the image processing conditions when they are corrected or determined.

DETAILED DESCRIPTION OF THE INVENTION

An image reading method of the present invention will be described below in detail with reference to preferred embodiments shown in the accompanying drawings.

Figure 1:
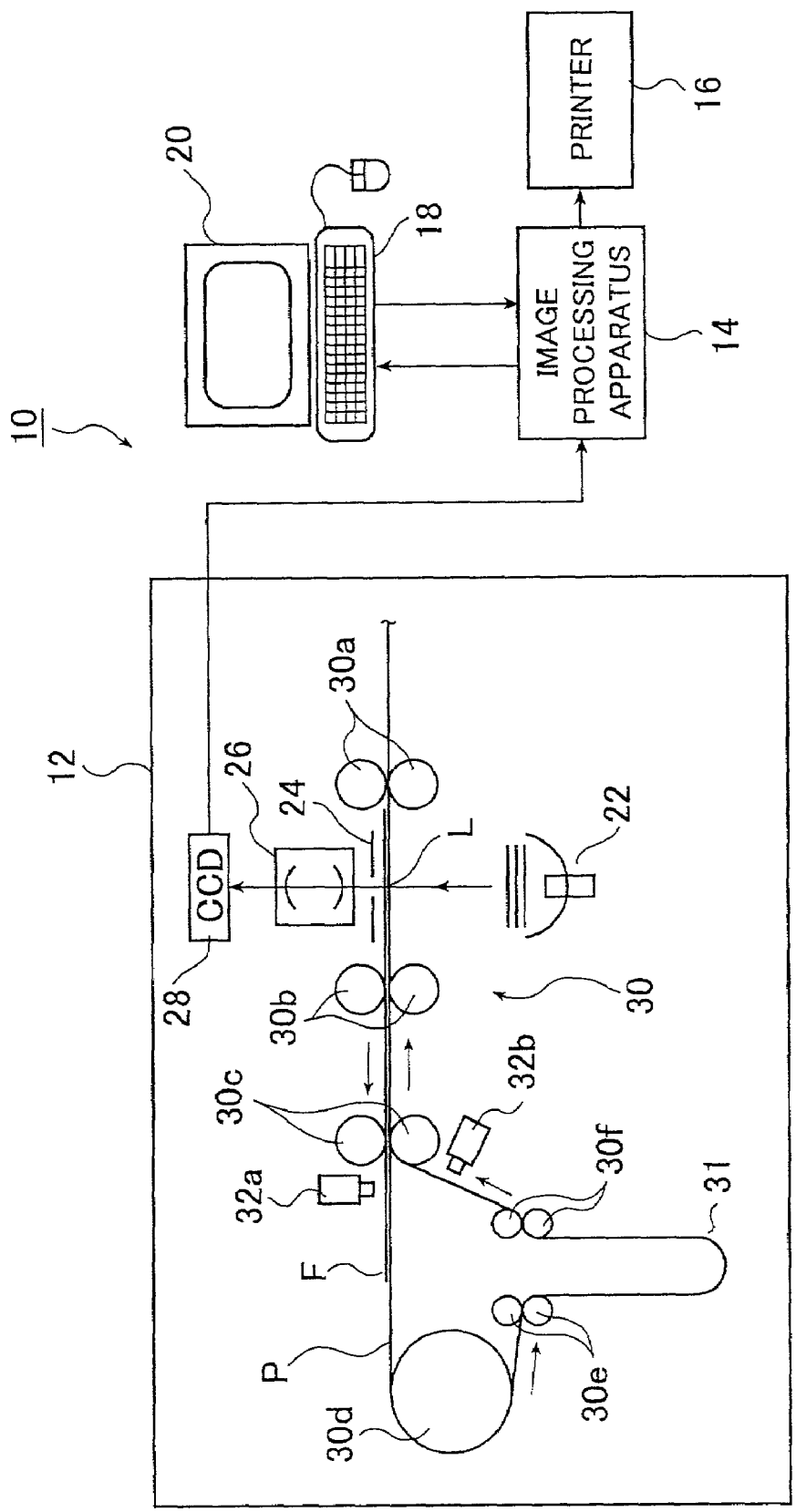
FIG. 1 is a schematic block diagram showing an exemplary digital photoprinter for embodying an example of an image reading method of the present invention.

FIG. 1 shows a block diagram of an example of a digital photoprinter for embodying the image reading method of the present invention.

The digital photoprinter, which is generally denoted by reference numeral 10 in FIG. 1 and hereinafter referred to simply as a photoprinter, basically includes a scanner (image reading apparatus) 12 that reads the image recorded on a film F photoelectrically, an image processing apparatus 14 that performs image processing of the thus read image data (image information) and that allows for manipulation, control and otherwise of the photoprinter 10 in its entirety, a printer 16 that exposes a light-sensitive material (photographic paper) imagewise with optical beams modulated in accordance with output image data supplied from the image processing apparatus 14, develops and otherwise processes the photo-sensitive material and outputs it as a (finished) print, a manipulating unit 18 having a mouse and a keyboard through which an operator optionally corrects and determines various image processing conditions, and a display unit 20 for displaying the image read with the scanner, various manipulative commands and pictures for setting and registering various conditions.

While the output image data in the embodiment under consideration is used to output a print from the printer 16, the output image data may be recorded in various kinds of recording media such as a floppy disc, an MO and the like or may be transferred making use of a communication line such as a phone line or a communication network such as Internet.

The scanner 12 is an apparatus for reading the image recorded on the film F or the like photoelectrically. The scanner 12 mainly includes an illuminant 22, a slit 24 for obtaining slit-shaped projected light from the film F by illuminating the film F passing through an image reading position L with the light from the illuminant 22, an imaging lens unit 26, and a line CCD sensor 28 as an image reading means corresponding to the reading of respective images of R (red), G (green) and B (blue). While not shown, the scanner 12 includes a variable diaphragm for variably setting the quantity of the reading light from the illuminant 22, a diffuser box for diffusing the reading light incident on the film F so that it becomes uniform across the plane of the film F, an amplifier for amplifying an image signal output from the line CCD sensor 28, and an analog to digital (A/D) converter for digitizing the image signal amplified by the amplifier, in addition to the above components.

Further, the scanner 12 includes a transport device 30 for transporting the film F, which has been transported for a prescan and moved in a left direction in the figure, along a loop-shaped transport path or transport path P which makes a round trip in a loop and returns to the image reading position L again.

The transport device 30 includes transport roller pairs 30a and 30b which form a read and transport path, and are disposed on the opposite sides of the image reading position L and used to scan the film F with the lengthwise direction thereof in coincidence with a direction perpendicular to the direction in which the line CCD sensor 28 extends. The reading light is incident on the film F while it is being transported and scanned by the transport roller pairs 30a. This operation results in that the film F having been passed through the image reading position L is scanned by the slit-shaped reading light two-dimensionally and the images of the respective frames recorded on the film F are read. The film F to be captured here is ordinarily disposed such that the film recording surface thereof, where images are recorded, faces the line CCD sensor 28, that is, the film surface thereof, where the images are recorded by exposing a light-sensitive layer composed of an emulsion such as silver halide or the like faces the line CCD sensor 28. In addition to the above, the film F may be disposed with the film surface thereof where the images are recorded facing the illuminant 22. This is because that the images recorded on the film F can be reproduced by determining or detecting the front and back surfaces and the up and down direction of the images and performing two-face inversion processing and one-face inversion processing of the images.

As described above, the reading light is made to the projected light which passes through the image reading position L through which the film F passes and bears the images. Then, the projected light is projected onto the light receiving surface of the line CCD sensor 28 by the imaging lens unit 26 after the slit-shaped projected light is obtained by the slit 24.

The line CCD sensor 28 is arranged as a so-called three-line color CCD sensor including a line CCD sensor 28R for capturing an R image, a line CCD sensor 28G for capturing a G image, and a line CCD sensor 28B for capturing a B image, and the respective line CCD sensors extend in a main scanning direction as described above. The projected light of the film F is separated into three primary colors of R, G, and B by the line CCD sensor 28 and read photoelectrically.

The image signals of the line CCD sensor 28 are amplified by the amplifier, converted to digital signals by the A/D converter and sent to the image processing apparatus 14.

The scanner 12 captures the images recorded on the film F twice. That is, the scanner 12 carries out a prescan for capturing the images with low resolution and a fine scan for obtaining the image data of output images.

In the prescan, not only the image regions of all the frames of the film F which are to be scanned with the scanner 12 but also the vicinities of the image regions in the width direction of the film and non-image regions between individual frames, that is, unrecorded regions are captured without interrupting the frames. The unrecorded regions include the regions where bar codes, for example, a DX code and bar codes showing frame numbers and the like are recorded above and below the frames in correspondence therewith.

Further, the prescan is carried out under preset prescan reading conditions so that the line CCD sensor 28 can capture the images without being saturated. In contrast, the fine scan is carried out under fine scan reading conditions which are set to each frame from prescanned data so that the line CCD sensor 28 is saturated at a density which is a little lower than the minimum density of each image (frame).

Therefore, the signals output in the prescan and the signals output in the fine scan are basically the same data except that they have a different image reading region, different resolution and a different output level.

The transport device 30, which transports the film F having been prescanned along the transport path P, includes transport roller pairs 30c, 30e, and 30f, and a transport roller 30d, in addition to the transport roller pairs 30a and 30b that form the read and transport path. In addition to them, the transport device 30 includes a not shown guide unit utilizing sprockets and the like for guiding the film F making use of the perforations thereof.

Further, the transport device 30 includes photoelectric sensors 32a and 32b disposed in the vicinity of the transport roller pairs 30c for detecting the extreme end and the trailing end of the film F in the lengthwise direction thereof and a buffer 31 for accommodating the film F between the roller pairs 30e and 30f in a dangling state. The rotation of the transport roller pair 30f is controlled in response to the signal, which is obtained by the photoelectric sensors 32a and 32b which detect the extreme end and the trailing end of the film F, so as to control the length of the film F in the buffer 31.

A reason why the buffer 31 is disposed is as described below. That is, when the extreme end of the film F, which has made one round trip along the loop-shaped transport path P, returns to the transport roller pair 30b, if the film F is relatively long and the trailing end thereof does not yet pass through the transport roller pair 30c, the transport of the extreme end of the film F must be stopped while transporting the intermediate and trailing end portions thereof.

The scanner 12 of the embodiment under consideration captures the image in each frame of the film F by scanning with the line CCD sensor 28 while the film F is being transported. However, the embodiment may employ a plane-sequentially-reading system in which an area CCD sensor is used in place of the line CCD sensor 28 and the reading light bearing each of the images of the film F is caused to form a focused image on the image-receiving plane of the area CCD sensor so as to entirely capture each image at a time. In this case, to capture R, G, and B images, a color filter sheet having an R filter, a G filter and a B filter, which correspond to the R, G, and B images, is inserted between the illuminant 22 and the film F and the image is captured utilizing the reading light having been sequentially filtered with the R filter, the G filter and the B filter. When the images of the film F are captured, all the frames of the film F or a predetermined number of frames thereof are prescanned and then subjected to the fine scan.

Figure 2:
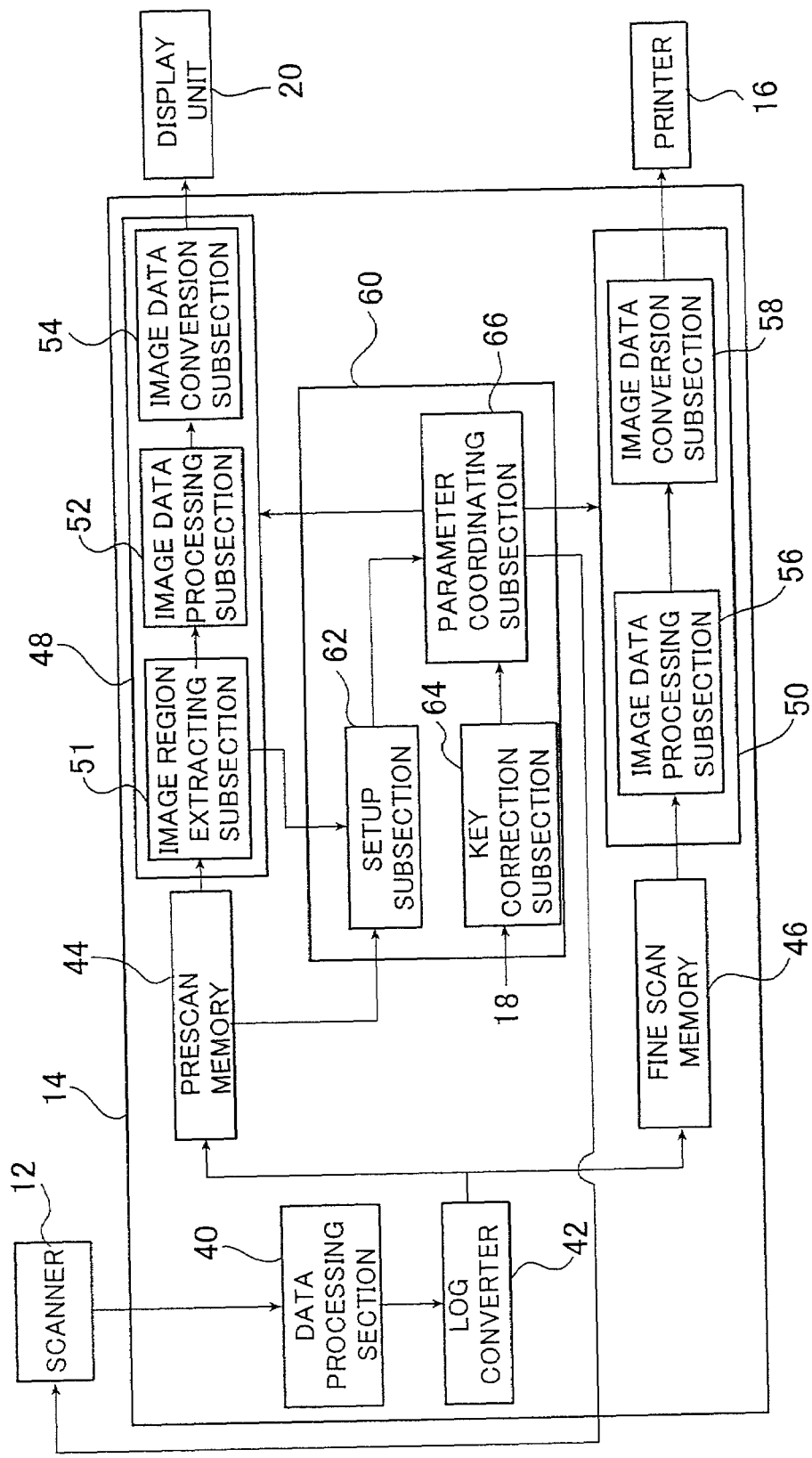
FIG. 2 is a block diagram showing an exemplary image processing apparatus used in the digital photoprinter shown in FIG. 1.

FIG. 2 shows a block diagram of the image processing apparatus 14. The image processing apparatus 14 includes a data processing section 40, a Log converter 42, a prescan (frame) memory 44, a fine scan (frame) memory 46, a prescan processing section 48, a fine scan processing section 50, and a condition setting section 60.

Note that FIG. 2 mainly shows sections relating to image processing, and the image processing apparatus 14 includes a CPU for controlling and managing the overall photoprinter 10 including the image processing apparatus 14 a memory for storing information necessary to the operation of the photoprinter 10 and the like, in addition to the above sections. Further, the manipulating unit 18 and the display unit 20 are connected to respective sections through the CPU and the like (CPU bus).

The respective digital signals of R, G, and B output from the scanner 12 are subjected to predetermined data processing in the data processing section 40 such as darkness correction, defective pixel correction, shading correction, and the like and converted to digital image data (density data) by the Log converter 42. Then, prescanned data is stored in the prescan memory 44 and fine-scanned data is stored in the fine scan memory 46, respectively.

The prescanned data stored in the prescan memory 44 is read and processed in the prescan processing section 48, which includes an image region extracting subsection 51, an image data processing subsection 52, and an image data conversion subsection 54, whereas the fine-scanned data stored in the fine scan memory 46 is read and processed in the fine scan processing section 50 which includes an image data processing subsection 56 and an image data conversion subsection 58.

The image region extracting subsection 51 of the prescan processing section 48 extracts the bar codes such as the DX code the bar codes showing the frame numbers and the like, which are located above and below the image frames, and obtains bar code information based on the bar codes as well as sets the frame position of the image of one frame (image region of one frame of a film) from the image data obtained by capturing the images recorded on the film F without interrupting the frames, in other words, extracts the image recorded region of each frame.

The positions where the bar codes are recorded on the film F in the width direction thereof are known to some extents. Thus, the bar codes are extracted based on the variation of an image density making use of the above positions and bar code information is obtained from the extracted bar codes. When the bar code information cannot be obtained from the extracted bar codes, the bar codes are read in an opposite direction, that is, when the bar codes are read from, for example, the scanning direction of the images to be captured, they are read from a direction opposite to the scanning direction, thereby obtaining the bar code information. The bar codes are recorded on the recording surface of the film F on which a light-sensitive layer is applied. Accordingly, it can be determined whether or not the reading surface of the film F, which has been captured while being caused to face the line CCD sensor 28, is the recording surface thereof by finding the reading direction in which the bar code information can be correctly obtained.

As a result, whether or not the film reading surface is the film recording surface is determined by finding the reading direction in which the bar code information can correctly obtained, and the film reading surface information is sent to a setup subsection 62. It should be noted that the bar code information may be read with a bar code reader if the film F was read from the recording surface side.

In the embodiment, the film F is not necessarily set to the scanner 12 so that the recording surface of the film is captured while being caused to face the line CCD sensor 28, which can simplify the processing job of the operator. This is because whether or not the two-face inversion processing of the image data is necessary is determined or judged in accordance with the film reading surface information which is obtained or detected by finding the bar code reading direction in which the bar code information can be obtained, and the two-face inversion processing of the image data is carried out as required in accordance with the determination or judgment made.

In contrast, the recorded image region is extracted by determining the edges at both the right and left ends and the edges at both the upper and lower ends of the image region of an original image from the prescanned data based on an image density value. For example, as to the edges at both the right and left ends, the position, where the image density value of the film F in the long axis direction thereof uniformly varies in the width direction of the film F perpendicular to the lengthwise direction thereof, is determined to be one of the edges of the image frame of the original image. Further, the image density value is examined from the above detected edge in consideration of the image size of the film in the lengthwise direction thereof which is determined from a type of the film obtained previously. Then, the position, where the image density value uniformly varies in the width direction of the film F is, determined to be the other edge of the image.

The thus obtained position information of the detected image region of the film F is sent to the setup subsection 62 and the image data processing subsection 52 which will be described later.

The image data processing subsection 52 of the prescan processing section 48 and the image data processing subsection 56 of the fine scan processing section 50 perform predetermined image processing steps to the image (image data) of the detected image region in accordance with the processing conditions set by the condition setting section 60 to be described later. The image data processing subsection 52 and the image data processing subsection 56 basically perform the same processing steps except that they are carried out with different resolution.

The image processing steps carried out by both the processing subsections are not particularly limited except that two-face inversion processing is performed in accordance with the film reading surface information, which will be described later, and various kinds of known image processing steps are exemplified such as gray balance adjustment, gradation correction and density (brightness) adjustment which are carried out using LUTs (look-up tables), type of recording illuminant correction, image saturation adjustment (color adjustment) and electronic magnification processing which are carried out by means of matrixes (MTXs) and further graininess suppression processing, sharpness emphasis processing, shutting light processing, (compression/expansion of the dynamic range of densities), and the like.

The two-face inversion processing is to reverse the right and left sides of an image before it is processed so as to obtain a so-called mirror image.

The image data conversion subsection 54 thins out the image data processed in the image data processing subsection 52 as necessary and converts it utilizing a 3D-LUT or the like in the same manner and supplies it to the display unit 20 as image data capable of being displayed thereon.

The image data conversion subsection 58 converts the image data processed in the image data processing subsection 56, using, for example, a 3D (three-dimensional)-LUT or the like and supplies it to the printer 16 as output image data to be recorded by the printer 16.

The condition setting section 60 includes the setup subsection 62, a key correction subsection 64 and a parameter coordinating subsection 66. The setup subsection 62 sets the various processing conditions in the prescan processing section 48 and the fine scan processing section 50 and the reading conditions in the fine scan.

The setup subsection 62 reads the prescanned data from the prescan memory 44, extracts the image recorded region of each frame using the position information of the image region sent from the image region extracting subsection 51, creates a density histogram, calculates image characteristic amounts such as an average density, highlight (minimum density), shadow (maximum density) and the like, and determines the reading conditions in the fine scan. Further, the setup subsection 62 creates the LUTs, which perform the gray balance adjustment, the gradation correction and the density adjustment, and a MTX calculation formula in response to the command and the like from the operation which is issued when necessary and sets various types of the image processing conditions in the prescan processing section 48 and the fine scan processing section 50, in addition to the creation of the density histogram and the calculation of the image characteristic amounts. Further, it is determined whether the two-face inversion processing must be carried out in the image data processing subsections 52 and 56 in accordance with the film reading surface information sent from the image region extracting subsection 51, and the information as to whether the two-face inversion processing is necessary or not is included in the image processing conditions. For example, when the film reading surface captured in the prescan is the film recording surface, the two-face inversion processing is not carried out in the image data processing subsections 52 and 56, whereas when the film reading surface captured in the prescan is not the film recording surface but is the back surface of the film recording surface, the two-face inversion processing is carried out in the image data processing subsections 52 and 56.

In the illustrated case, the image region of one frame is determined in the image region extracting subsection 51 of the prescan processing section 48, but this is not the sole case of the present invention and the image region may be determined in the setup subsection 62 of the condition setting section 60.

The key correction subsection 64 calculates the amount of adjustment of the image processing conditions in accordance with the various types of commands and the like input through a keyboard 18a and a mouse 18b for adjusting the density (brightness), color, contrast, sharpness, saturation and the like and supplies the amount to the parameter coordinating subsection 66.

The parameter coordinating subsection 66 receives the image processing conditions set by the setup subsection 62 and supplies them to the prescan processing section 48 as well as coordinates the processing conditions such as the image processing condition and the like which are applied to the fine scanned image data and sets the coordinated processing conditions to the fine scan processing section 50.

While the prescan is being carried out in the prescan processing section 48, a series of verification processing steps can be performed by calling a portion of the prescanned data having been read. In the verification processing steps, the image of each frame is extracted from the prescanned data and subjected to various types of image processing steps, the processed image is displayed on the display unit 20 and the frame position of one frame and the image processing conditions are corrected as required and determined by the operator, and then the verification is finished. Further, the image of a frame, which has been subjected to the verification processing, is subjected to the fine scan by the scanner 12 and to the image processing in the fine scan processing section 50 and output as a print by the printer 16 in parallel with the verification job carried out by the operator. These operations are carried out under the control of the CPU.

Next, the image reading method of the present invention will be described based on the above-mentioned scanner 12 and the image processing apparatus 14.

The operator, who is requested to create a print of the strip- or sleeve-like film F, sets the film F and inputs necessary commands for the contents to be processed such as the print size of the print to be created, and the like and then instructs to start the creation of the print.

With this operation, the diaphragm value of the scanner 12 and the accumulation time of the line CCD sensor 28 are set in accordance with the reading conditions of a prescan. Subsequently, the prescan is started by scanning the film F in an auxiliary scanning direction at a speed corresponding to the prescan.

The film F is scanned slitwise at the image reading position L while being transported and the light projected from the film F forms a focused image on the line CCD sensor 28, and the image recorded on the film F is decomposed to R, G, and B and read photoelectrically.

In the prescan, all the frames of the film F are continuously captured without being interrupted. However, a plurality of the predetermined number of frames may be continuously prescanned.

The signal output from the line CCD sensor 28 in the prescan is amplified and converted to a digital signal by the not shown A/D converter.

The digital signal is sent to the image processing apparatus 14, subjected to predetermined data processing in the data processing section 40, made to prescanned data as digital image data in the Log converter 42, and stored in the prescan memory 44.

The film F, which has been read by the prescan at the image reading position L, is transported to a prescan completion side which is located on the left side with respect to the image reading position L in FIG. 1 and passes through the transport roller pairs 30c and the transport roller 30d.

The photoelectric sensor 32a, which is disposed at the outlet of the transport roller pair 30c, detects the trailing end of the film F being transported, whereas the photoelectric sensor 32b, which is disposed at the inlet of the transport roller pair 30c where the film F having made one round trip along the transport path P reaches, detects the extreme end of the film F being transported, and the CPU of the image processing apparatus 14 determines whether or not the trailing end of the film F is detected by the photoelectric sensor 32a before the extreme end thereof is detected by the photoelectric sensor 32b. When the trailing end of the film F is detected by the photoelectric sensor 32a before the extreme end thereof is detected by the photoelectric sensor 32b, the transport roller pair 30f continues the transport of the film F without being stopped. After the trailing end of the film F passes through the transport roller pair 30c, the rotational direction thereof is reversed during a time before the film F is transported thereto and then the transport roller pair 30c is rotated steadily. Accordingly, when the extreme end of the film F reaches the inlet of the transport roller pair 30c, it is transported in the direction of the transport roller pair 30b by the transport roller pair 30c and stopped at a predetermined position so as to be subjected to a fine scan.

On the other hand, when the trailing end of the film F is not detected by the photoelectric sensor 32a before the extreme end thereof is detected by the photoelectric sensor 32b, the rotation of the transport roller pair 30f is stopped so as to stop the transport of the extreme end of the film F until the trailing end of the film F passes through the transport roller pair 30c. In contrast, the transport roller pair 30c, the transport roller 30d and the transport roller pair 30e are continuously rotated and transport the film F, which causes the film F to be supplied to and accumulated in the buffer 31 in a dangling state.

When the trailing end of the film F is detected by the photoelectric sensor 32a, the transport roller pair 30c is steadily rotated with the rotating direction thereof reversed. Thereafter, the rotation of the transport roller pair 30f is started and the extreme end of the film F reaches the transport roller pair 30c. Further, the extreme end of the film F is transported in the direction of the transport roller pair 30b by the transport roller pair 30c and stopped at the predetermined position so as to be subjected to the fine scan.

As a result, the film reading surface read in the prescan corresponds to the back surface of the film reading surface in the fine scan because the transport path P is formed as the loop-shaped transport path as described above.

It will be examined, for example, such a case that the image of characters "ABC" is recorded on the image of a frame of the film F and the image is captured at the image reading position L while scanning the film F. When the image is captured using the film recording surface as a film reading surface in the prescan as shown in FIG. 3A, an image shown on the right side of FIG. 3A can be obtained.

Figure 3A:
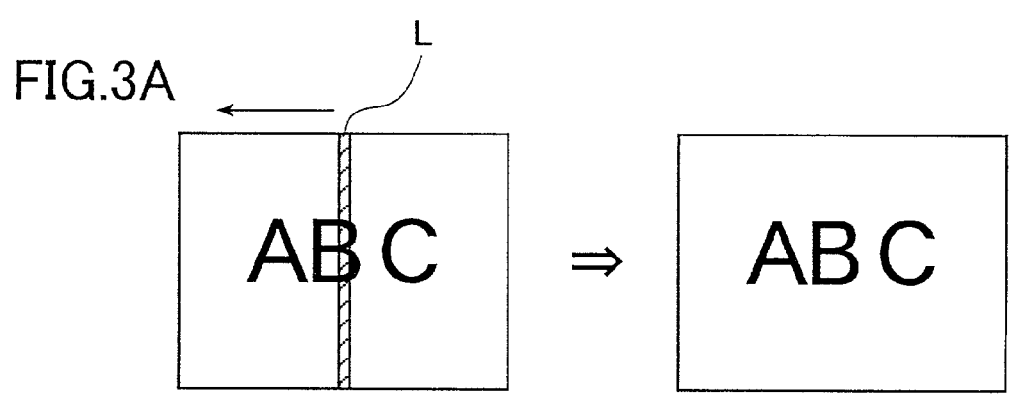
FIG. 3A to FIG. 3C are views explaining how an image is read by the image reading method of the present invention.
Figure 3B:
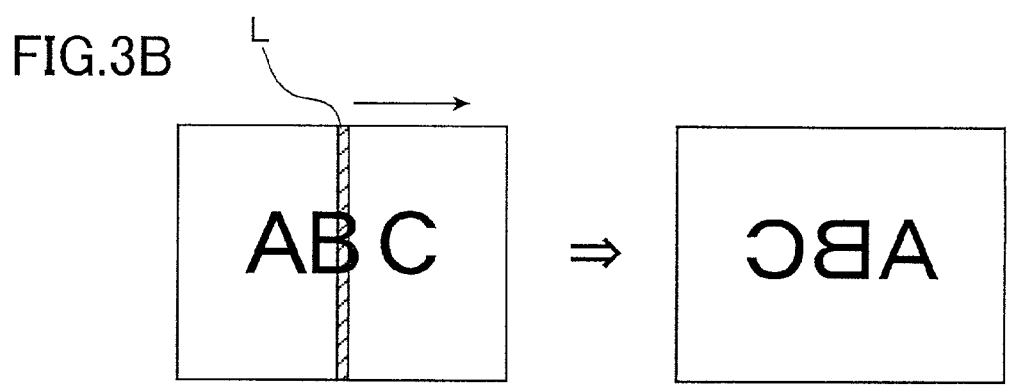
Figure 3C:
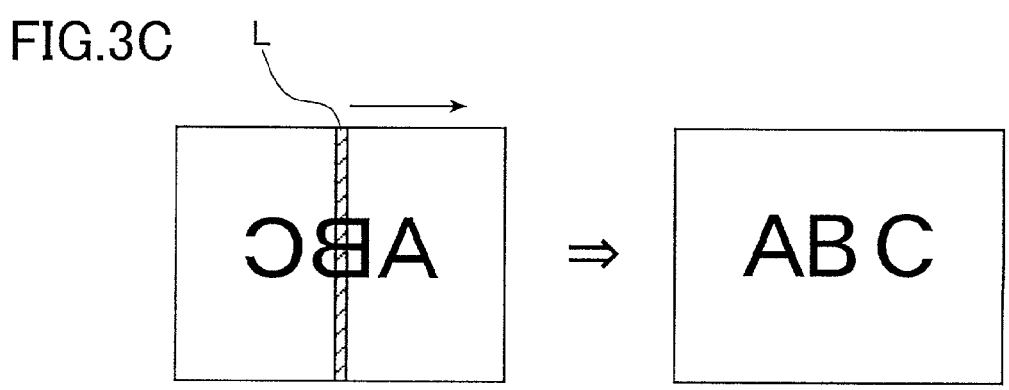

However, as shown in FIG. 3B, an image read in a conventional fine scan is made to the mirror image of the image read in the prescan shown FIG. 3A because the film F, which has been scanned in a prescan, is scanned in a reverse direction in the conventional fine scan. To cope with this problem, the front and back side arrangement processing is conventionally carried out to fine-scanned data to obtain the image of "ABC". In the present invention, the transport path P is arranged as the loop-shaped transport path so that the film reading surface in the fine scan is the back surface of the film reading surface in the prescan as shown in FIG. 3C. However, the film F is scanned in the fine scan in a direction opposite to the direction in which it was scanned in the prescan so as to obtain the image of "ABC" as shown on the right side of FIG. 3C. Accordingly, when the film reading surface, which is read in the prescan, is the film recording surface having an image recorded on the film F, it is not necessary to perform the two-face inversion processing which is carried out conventionally. In particular, when the prescan is carried out by setting the film recording surface as the film reading surface without fail, it is not necessary at all to perform the two-face inversion processing, which will improve a processing efficiency.

Further, when it is determined or judged whether or not the two-face inversion processing must be carried out on image data based on the film surface reading information obtained in the image region extracting subsection 51 and the inversion processing of the image data is carried out, when necessary, based on the determination or judgment made, it is not necessary to set the direction of the film F in the prescan, that is, the film recording surface as the film reading surface, which will improve the job efficiency of the operator.

It should be noted that in a plane-sequentially-reading system using an area CCD sensor, when the film reading surface to be read in the prescan is the film recording surface having the image recorded on the film F, an image read in the fine scan is the image of the back surface of the image "ABC" as shown on the left side of FIG. 3C. Therefore, the two-face inversion processing is carried out on the image to obtain the image of "ABC". Further, when it is determined or judged whether or not the two-face inversion processing must be carried out on the image data based on the film surface reading information, if the film reading surface to be read in the prescan is the film recording surface having the image recorded on the film F, it is determined or judged that the two-face inversion processing must be carried out on the image data. Otherwise, it is determined or judged that the two-face inversion processing is not necessary because the image to be read in the fine scan is the image recorded on the film recording surface.

When a predetermined amount of prescanned data is stored in the prescan memory 44, a portion of the prescanned data is sent to the image region extracting subsection 51 before the prescan is finished as well as read in the condition setting section 60 and supplied to the setup subsection 62.

The image region extracting subsection 51 extracts the position information of an image recorded region making use of the image density thereof corresponding to each frame from the prescanned data supplied thereto, and further extracts the bar codes such as the DX code, the bar codes showing the frame numbers and the like and obtains the film reading surface information from the reading direction of the bar code information resulting from the bar codes.

The thus obtained position information of the image recorded region is sent to the setup subsection 62 and also to the image data processing subsection 52 together with the prescanned data. Further, the film reading surface information is also sent to the setup subsection 62.

The setup subsection 62 extracts the image data of the recording region of each frame from the prescanned data sent thereto from the image region extracting subsection 51, and creates density histograms and calculates image characteristic quantities such as average density, LATD (large area transmission density), highlight (minimum density), shadow (maximum density) and the like from the image data; in addition, in response to the operator's command that is optionally entered through the key correction subsection 64, the setup subsection 62 create tables (LUTs) for performing gray balance adjustment and the like and generates matrix operations (MTX) for correcting saturation so as to determine image processing conditions. The thus obtained image processing conditions are supplied to the parameter coordinating subsection 66.

The coordinated image processing conditions are sent to the prescan processing section 48, and predetermined image processing is carried out according to the image processing conditions. For example, when the film reading surface in the prescan is not the film recording surface, the two-face inversion processing is carried out and further the above-mentioned image processing steps are performed. The thus obtained image data is sent to the image data conversion subsection 54 and converted to output image data appropriate to the display 20 and sent thereto.

The operator corrects as required and determines the frame position and subsequently the image processing conditions through the key correction subsection 64 using the manipulating unit 18 while observing the processed image displayed on the display unit 20. The verification processing is thus performed.

The verification processing, which is performed by extracting the image data corresponding to each frame from the prescanned data read in the prescan, is carried out in parallel with the prescan and the fine scan performed by the scanner 12. Accordingly, when the prescan is completed, the film F is transported throughout the transport path P and instantly subjected to the fine scan sequentially from the image of the initial frame having been verified. The parameter coordinating subsection 66 sends a command for the fine scan to the scanner 12 together with the position information of the image recorded region so that the image processing apparatus 14 can cope with the fine scan which is performed instantly.

The operator can perform the relatively time-consuming verification processing while the prescan is being carried out, which can reduce the processing time from the prescan to the output of a print.

The film F is transported along the transport path P after the completion of the prescan and set at the predetermined position on the side where the prescan was completed. Thus, when the fine scan start command is received, only the recorded image of each frame is read in the fine scan based on the position information of the image recorded region.

In the fine scan, the original image is read by the scanner 12 with the high resolution different from the prescan and the thus read original image is subjected to image processing under the image processing conditions determined in the prescan image and obtained as output image data.

The fine scanned film F is transported to the original position where the film F was set.

The respective output signals of R, G, and B output from the scanner 12 are subjected to the analog to digital (A/D) conversion, Log conversion, DC offset correction, darkness correction shading correction and the like and arranged as digital input image data, and the fine-scanned data is stored in the fine scan memory 46.

The fine-scanned data, which is stored in the fine scan memory 46, is sent to the image data processing subsection 56 and subjected to various types of image processing steps through the tables (LUTs) for performing the gray balance adjustment and the like and through the matrix operations (MTX) for performing the saturation correction and further subjected to the correction of aberration caused by a photographing lens. Thereafter, the fine-scanned data is subjected to electronic magnification processing so as to be fitted to a desired print size. Further, the fine-scanned data is subjected to the two-face inversion processing when necessary. Furthermore, the fine-scanned data is optionally subjected to sharpness processing, shutting light processing and the like and thereafter sent to the image data conversion subsection 58 as the output image data.

The output image data is converted to print output data suitable to the printer 16 in the image data conversion subsection 58 and sent thereto as the output image data.

The printer 16 is composed of a recording apparatus (print apparatus) for exposing a light-sensitive material (photographic paper) in accordance with the image data supplied thereto and recording the latent image thereof and a processor (development apparatus) for subjecting the light-sensitive material as a material to be exposed to predetermined processing and outputting it as a print.

In the recording apparatus, after the light-sensitive material is cut to a predetermined length in accordance with a print, three kinds of light beams for red (R) exposure, green (G) exposure and blue (B) exposure, which correspond to the spectral sensitivity characteristics of the light-sensitive material, are modulated in accordance with the image data output from the image processing apparatus 14 as well as deflected in the main scanning direction, and the light-sensitive materials are transported in the auxiliary scanning direction which is perpendicular to the main scanning direction so that the light-sensitive materials are scanned and exposed two-dimensionally with the light beams and latent images are recorded thereon. Then, the light-sensitive materials are sent to the processor. The processor, which has received light-sensitive materials, subjects them to predetermined wet type development processing such as color formation/development, bleaching/fixing, washing, and the like, and then they are dried. Thereafter, the light-sensitive materials are sorted in a predetermined unit such as a unit of one film and the like and collected as prints.

As described above, the fine scan performed by the scanner 12 and the output of the prints by the printer 16 can be carried out to the images of the frames, which have been subjected to the verification processing, in parallel with each other while the verification processing is being carried out, which can reduce the processing time from the prescan to the output of the prints.

Further, the frames are processed in the same sequence in the respective steps of the prescan, the image processing, the verification processing and the fine scan, which can eliminate the conventional troublesome job of performing the fine scan in consideration of the frames arranged reversely so that a simpler photo printer can be produced.

Figure 4:
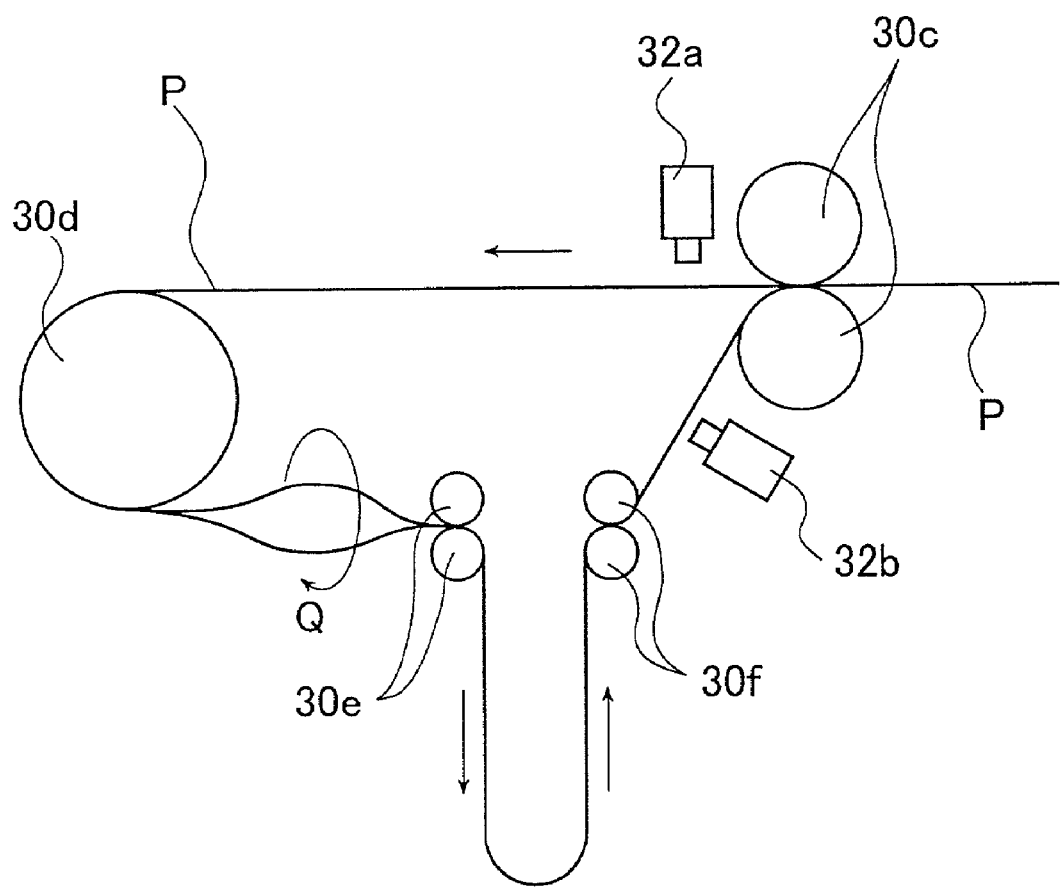
FIG. 4 is a conceptual view explaining an exemplary film transport path in a scanner for embodying another example of the image reading method of the present invention.

In the image reading method described above as the embodiment, the film F, which has been prescanned and located on the prescan completion side, is transported along the loop-shaped transport path P and set again at a predetermined position on the prescan completion side so that the film reading surface in the prescan corresponds to the back surface. As shown in FIG. 4, however, a transport path, on which the film F is twisted half, is disposed at at least one position, for example, at a position Q between the transport roller 30d and the transport roller pair 30e so that the film reading surface in the fine scan is the same as the film reading surface in the prescan.

When the film F is twisted half while it is being transported as described above, out of focus that is caused in the prescan and the fine scan by a slight amount of dislocation, which corresponds to the thickness of the film F, of the position of the film recording surface in the optical axis direction thereof can be accurately suppressed. Moreover, the operator can perform the verification processing to the frames, which been subjected to the verification processing, in the sequence in which the frames are read before the prescan of all the frames is completed. Further, the fine scan can be instantly carried out to the frames having been subjected to the verification processing, whereby the processing efficiency can be improved.

At this time, when scan reading is carried out by the line CCD sensor, if it is determined that the film reading surface in the prescan is the film recording surface based on the film surface reading information, the two-face inversion processing is not carried out to the fine-scanned data and only the one-face inversion processing step is carried out thereto.

Further, when it is determined that the film reading surface in the prescan is the back surface of the film recording surface, the fine-scanned data is subjected to the two-face inversion processing and the one-face inversion processing. In the one-face inversion processing of the fine-scanned data, the upsides of the images on the film F, which have been read in the state that the width direction of the film F perpendicular to the lengthwise direction thereof is set in an up/down direction, is replaced with the down sides of the images. A reason why the one-face inversion processing is performed is to prevent the images having been read from being output as prints in which the images are upset vertically, to prevent the vertically upset images from being recorded in various types of recording mediums such as a hard disc, a floppy disc and the like and to prevent them from being transferred through a telephone line and the like because the up/down direction of the film F is reversed in the fine scan while the film reading surface is the same as the film reading surface in the prescan. Information whether or not the fine-scanned data must be subjected to the two-face inversion processing and the one-face inversion processing is included in the image processing conditions which are determined based on the prescanned data, and the fine-scanned data is subjected to the two-face inversion processing and the one-face inversion processing based on the image processing conditions.

It should be noted that in the plane-sequentially-reading system in which the area CCD sensor is used in place of the line CCD sensor, if it is determined that the film reading surface in the prescan is the film recording surface, the image data is subjected to the two-face inversion processing and the one-face inversion processing. Whereas, when it is determined that film reading surface in the prescan is the back surface of the film recording surface in the fine scan, only the one-face inversion processing is carried out.

Figure 5:
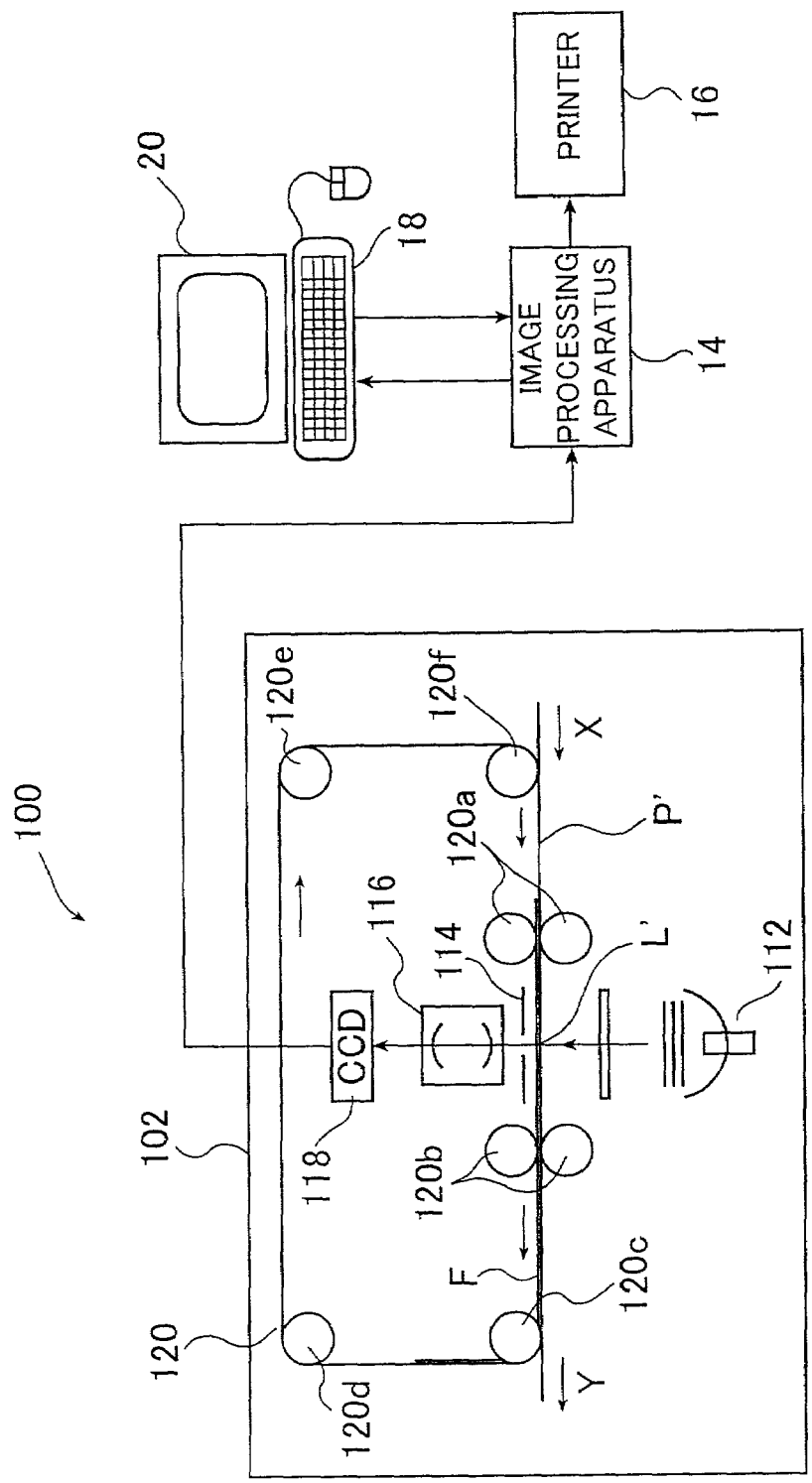
FIG. 5 is a schematic block diagram showing another example of the digital photoprinter for embodying still another example of the image reading method of the present invention.

Further, FIG. 5 shows still another embodiment for embodying the image reading method of the present invention.

A photoprinter 100 for performing the image reading method shown in FIG. 5 basically includes a scanner, an image processing apparatus, a printer, a display unit and a manipulating unit which are arranged similarly to the image processing apparatus 14, the printer 16, the display unit 20 and the manipulating unit 18 of the photoprinter 10 shown in FIG. 1 except the scanner. Thus, the image processing apparatus, the printer, the manipulating unit and the display unit are denoted by the same numerals as those of the image processing apparatus 14, the printer 16, the display unit 20 and the manipulating unit 18 of the photoprinter 10, and the description of the arrangements thereof is omitted.

The scanner 102 is an apparatus for reading the image recorded on a film F or the like photoelectrically. The scanner 102 mainly includes, similarly to the scanner 12 show in FIG. 1, an illuminant 112, a slit 114 for obtaining slit-shaped projected light from the film F by illuminating the film F located at an image reading position L' with the light from the illuminant 112, an imaging lens unit 116, and a line CCD sensor 118 as an image reading means corresponding to the reading of respective images of R (red), G (green) and B (blue). While not shown, the scanner 102 also includes a variable diaphragm for variably setting the quantity of the reading light from the illuminant 112, a diffuser box for making the reading light incident on the film F uniform in the plane direction of the film F, an amplifier for amplifying an image signal output from the line CCD sensor 28, and an analog to digital (A/D) converter for digitizing the image signal amplified by the amplifier, in addition to the above components.

The scanner 102 is different from the scanner 12 shown in FIG. 1 only in that a transport path P' and a transport device 120 are different from those of the scanner 12 shown in FIG. 12. Thus, the description of an image reading action is omitted.

The transport device 120, which transports the film F having been prescanned along the transport path P', includes transport roller pairs 120a and 120b as well as transport rollers 120c, 120d, 120e and 120f. Further, the transport unit 120 includes a not shown guide device utilizing sprockets and the like for guiding the film F making use of the perforations thereof.

The transport device 120 forms the loop-shaped transport path P' that transports the film F, which has been loaded from an X-direction in FIG. 5 and read in a prescan passing through the image reading position L', in the direction of the transport roller 120c as shown in FIG. 5, changes the direction of the film F upward at the position of the transport roller 120c, and returns the film F to a film set position on a prescan start side where the film F was located before the start of the prescan.

After the completion of the prescan, the film F is instantly caused to make one round trip along the loop-shaped transport path P' so that frames of the film F, which have been subjected to a verification processing step, are instantly subjected to a fine scan in the sequence of the frames which have been read in the prescan and subjected to the verification processing step before the verification of the images of all the frames is completed as described as to the photoprinter 10. With this operation, a processing efficiency can be improved.

Thereafter, the film F, which has been subjected to the fine scan, is transported in a Y-direction in FIG. 1.

Further, the frames are processed in the same sequence in the respective steps of the prescan, the image processing, the verification processing and the fine scan, which can eliminate the conventional troublesome job of performing the fine scan in consideration of the frames arranged reversely so that a simpler image reading apparatus and a simpler image processing apparatus can be produced.

Figure 6A:
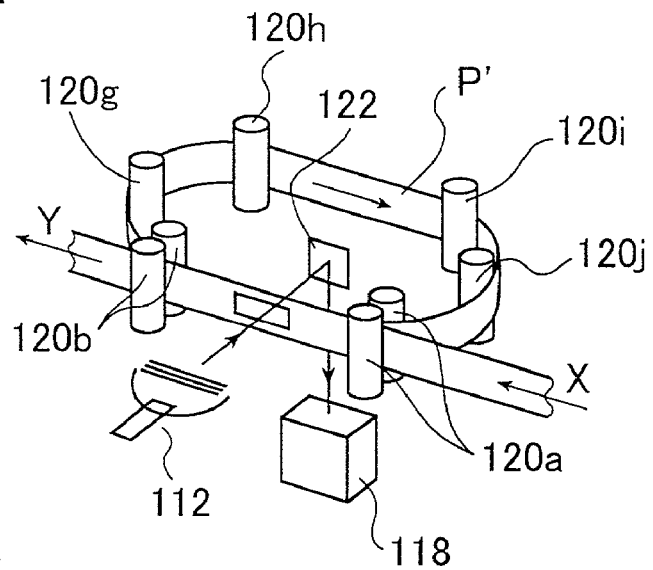
FIG. 6A to FIG. 6C are conceptual views each explaining another example of the scanner for embodying a further example of the image reading method of the present invention.
Figure 6B:
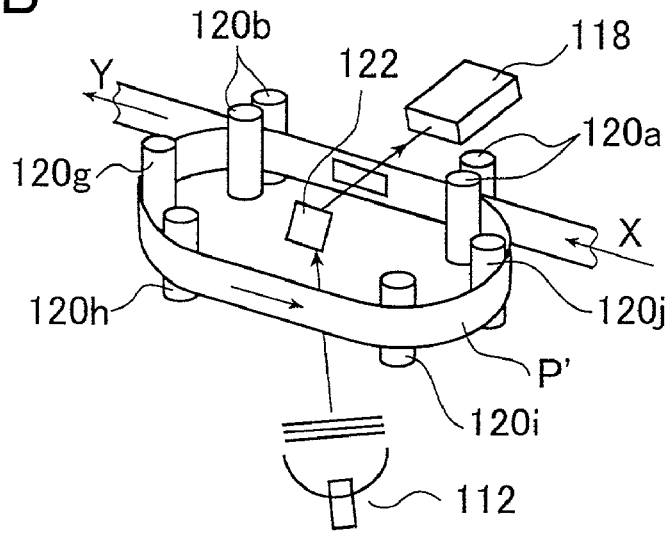
Figure 6C:
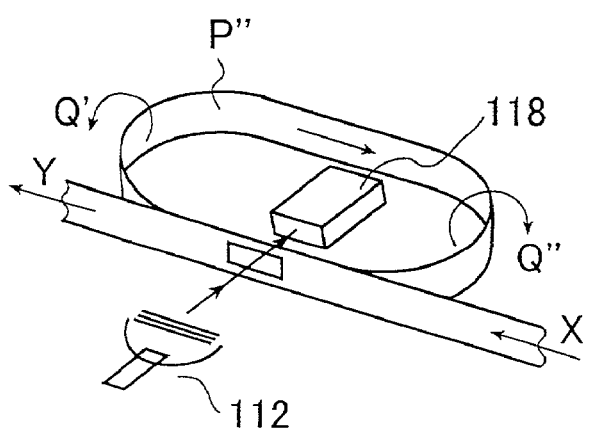

FIGS. 6A to 6C show further embodiments in which the film F, which has been loaded from an X-direction, read in a prescan and transported, is caused to make one round trip along a loop-shaped transport path and subjected to a fine scan after it is set again at the position where it was set before the prescan, and thereafter transported in a Y-direction in the figure.

In the embodiment shown in FIG. 6A, transmitting light bearing the images recorded on the film F is reflected on a reflection sheet 122 downward at a right angle and changes its optical path and received by a line CCD sensor 118. The overlap or intersection of the transport path P' and the optical path of the transmitting light passing through the film F can be prevented by the change of the optical path of the transmitting light. As a result, the length of the transport path P' can be shortened.

In the embodiment shown in FIG. 6B, the direction of the optical path of the projected light projected upward from the illuminant 112 is bent in a right-angled direction just before it is projected onto the film F, which prevents the overlap or intersection of the transport path P' and the optical path of the transmitting light passing through the film F similarly to the embodiment shown in FIG. 6A. As a result, the length of the transport path P' can be shortened.

Further, the embodiment of FIG. 6C is arranged such that the film F is twisted at a position Q' so as to lift a transport path P''', thereby disposing the transport path P''' above the line CCD sensor 118 to prevent the overlap or intersection of the transport path P''' and the position where the line CCD sensor 118 is disposed. Thereafter, the film F twisted at the position Q' is untwisted at a position Q'' by the amount of twist thereof and returned to the position where it was set before the prescan. Note that transport rollers and transport roller pairs are omitted in FIG. 6C. Also in the embodiment, the length of the transport path P''' can be shortened similarly to the embodiments shown in FIGS. 6A and 6B.

Further, the embodiments shown in FIGS. 6A to 6C may be provided with the buffer 31 and the photoelectric sensors 30a and 30b as shown in FIG. 1 so as to the cope with the variation of the length of the film F.

As described above, the direction of the film surface of the film F in the fine scan is the same as that of the film surface in the prescan and the up/down direction of the film F is not also reversed, and further the film F is transported in the same direction, which eliminates the necessity of performing the two-face inversion processing and the one-face inversion processing of the image data in consideration of the film reading surface of the film F.

Moreover, in the above-described embodiment, the loop-shaped read and transport path of the film which includes therein the image reading position where the image in the frame of the film is read is formed and then, at the entry side or the exit side of this loop-shaped read and transport path, the extreme edge of the film which has been prescanned is returned to the read and transport path; however, the present invention is not limited to the above-described way and the film may be returned in any way as long as the extreme end of the film which has been prescanned can be returned to the read and transport path. For example, as in the scanner 130 shown in FIGS. 7A to 7F, the loop-shaped read and transport path may not necessarily be formed.

As shown in these figures, the scanner 130, as is same with the scanner 12 shown in FIG. 1 and the scanner 102 shown in FIG. 5, is a photoelectric reading device which comprises a light source 132, a slit 134, an imaging lens unit 136, a line CCD sensor 138 and a transport device 140 of the film F. The scanner 130 and both of the scanner 12 shown in FIG. 1 and the scanner 102 shown in FIG. 5 are the same except for the transport device 140, both of the transport devices 30 and 120, and the transport paths P and P' so that explanations of image reading operations by the light source 132, the slit 135, the imaging lens unit 136 and the line CCD sensor 138 are omitted.

The transport device 140 includes a holding device 146 that holds the extreme end of the film F which has been prescanned for bringing back, that is, returning the film F which has been prescanned to the read and transport path and a nip roller pair 148 having a fixed roller 148a and a movable roller 148b for holding the trailing end of the film F which has been prescanned, in addition to two sets of the transport roller pairs 142 and 144 which constitute the read and transport path. In addition to them, the transport device 140 includes a guiding unit utilizing a sprocket (not shown) and the like for guiding the film F along the read and transport path making use of perforations thereof.

Figure 7A:
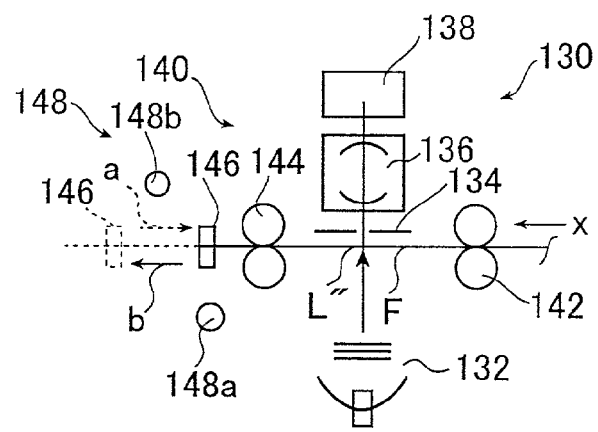
FIG. 7A to FIG. 7F are conceptual views each explaining a sequential operation for transporting a film in a scanner for embodying a still further example of the image reading method of the present invention.

The transport device 140 is arranged as follows: As shown in FIG. 7A, in the prescan, when the extreme end of the film F, which has been carried in in an X direction, scan-transported by 2 sets of transport roller pairs 142 and 144 and read while passing through the image reading position L", passes through the transport roller pair 144, the holding device 146 which was initially located at an initial position shown in a dashed line is moved in a direction of an arrow a shown in a dashed line to a position on a solid line holds the extreme end of the film F, moves it in a direction of an arrow b shown in a solid line back to the initial position while holding the film F and stops there. The way of holding the extreme end of the film F is not particularly limited but any ways such as a way of pinching by two rod-shaped bodies, a way of pinching by a U-shaped member, a way of pinching or nipping by a pinch roller or a nip roller and the like may be permissible.

Figure 7B:
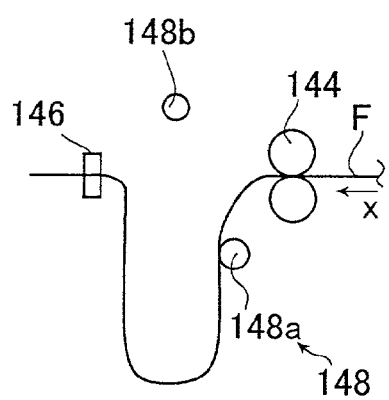

Thereafter, as shown in FIG. 7B, the film F which has been prescanned is continuously transported by the transport roller pair 144 and forms a loop by a gravitational force between the holding device 146 and the fixed roller 148a of the nip roller pair 148.

Figure 7C:
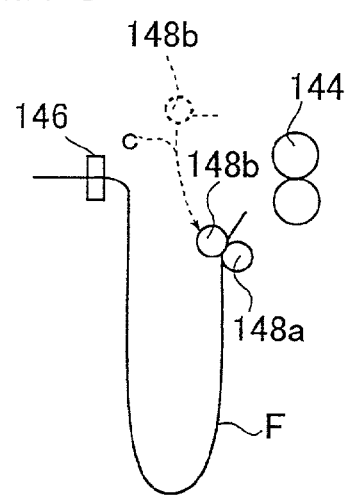

Then, as shown in FIG. 7c, before the transport roller pair 144 discharges the trailing end of the film F, the movable roller 148b of the nip roller pair 148 rotates in a direction of an arrow c shown in a dashed line and nips the film F with the fixed roller 148a in-between. After the transport roller pair 144 discharged the trailing end of the film F, the nip roller pair 148 hold the trailing end of the film F which formed the largest loop. The transport roller pair 144 stop its rotation (normal rotation).

Figure 7D:
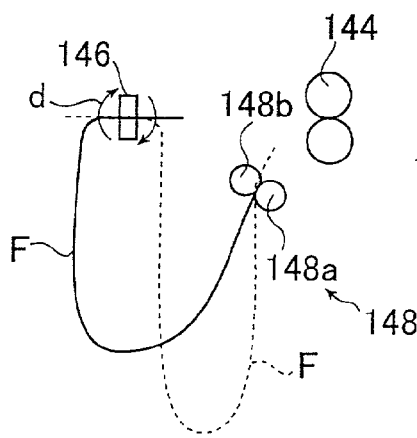

Subsequently, as shown in FIG. 7D, the holding device 146 reverses its course in a direction of an arrow d by 180 degrees as it holds the extreme end of the film F such that a state shown in a dashed line is changed to a state shown in a solid line to put the extreme end of the film F to a direction of the transport roller pair 144.

Figure 7E:
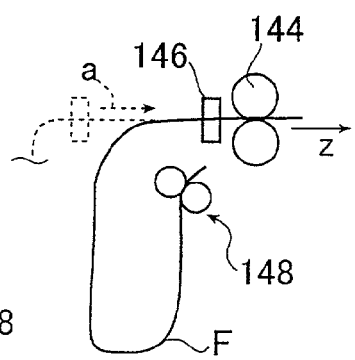

Next, as shown in FIG. 7E, after reversing the course, the holding device 146 moves as it holds the extreme end of the film F from the initial position shown in a dashed line in a direction of an arrow a shown in a dashed line onto a position on a solid line and abuts the extreme end of the film F against a nip point of the transport roller pair 144. Thereafter, the transport roller pair 144 starts rotation in a reverse direction (reverse rotation) to transport the extreme end of the film F in a reverse direction shown by an arrow z in FIG. 7E to the image reading position P'". By doing as described above, the holding device 146 can return the extreme end of the film F to the exit side of the read and transport path of the prescan.

Figure 7F:
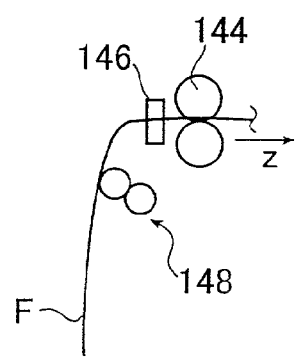

Subsequently, as shown in FIG. 7F, 2 sets of the transport roller pairs 142 (see FIG. 7A) and 144 transport the film F in a reverse direction shown by an arrow z whereupon fine scan of the image in the frame of the film F is performed in the image reading position P'".

After the fine scan is performed, the holding device 146 either stands ready to hold the extreme end of the film F which is prescanned next or moves back to the initial position. On this occasion, the holding device 146 may stop after reversing its course in a reverse direction; however, if it is possible to hold the extreme end of the film F, then it may stop either as it is or as it reverses its course in a forward direction. Further, the movable roller 148b of the nip roller pair 148 may stop after rotating into the initial position shown in FIG. 7A.

Furthermore, in the embodiments shown in FIGS. 7A to 7F, at the time of fine scan, the extreme end of the film F is inserted in the downstream side (left-hand side seen in figures.) of the transport roller pair 144 by the holding device 146, that is, returned to the exit side of the read and transport path of the prescan. However, the present invention is not limited to the above-described way but, as shown in FIGS. 6A to 6C, the extreme end of the film F is inserted in the upstream side (right-hand side seen in figures) of the transport roller pair 142, that is, returned to the entry side of the read and transport path of the prescan.

Still furthermore, when the extreme end of the film F is returned to the exit side or the entry side of the read and transport path of the prescan, detection of the extreme or trailing end of the film F, detection or judgment of presence or absence of the tow-face inversion processing or the one-face inversion processing of the image data in view of detection of two faces and the film reading face are the same as those described above so that explanations thereof are omitted.

In the above-described embodiments, when the image reading of the image in the frame of the film is performed twice, firstly the prescan is performed with a low resolution and secondly the fine scan is performed with a high resolution. On these occasions, by the first image reading, a frame position of the image of the film and an image reading condition of the second image reading can be determined and, if the second image reading can obtain the image data which is reproducible as a print, the first and second image reading can be performed with the same resolution. On this occasion, the image processing condition may be determined by the second image reading.

While the image reading method of the present invention has been described above in detail, the present invention is particularly effective to processors which take orders for a lot of prints which are output by connecting a plurality of films in the improvement of a job efficiency and a processing capability.

It should be noted that the present invention is by no means limited to the above embodiments and it goes without saying that various improvements and modifications can be made within the range which does not depart from the gist of the invention.

As described above in detail, according to the present invention, reading efficiency can be improved when image reading is performed twice on images recorded in a plurality of frames of a film.

According to a further embodiment of the present invention, the film, which has been subjected to the prescan, is transported along the loop-shaped transport path and read in the prescan in the sequence of the frames of the film read in the prescan. Moreover, the fine scan can be instantly started to the frames having been subjected to the verification process just after the completion of the prescan, whereby the job efficiency and the processing capability can be improved.

According to another embodiment of the present invention, the verification processing step can be started before all the images of the plurality of frames are read in the prescan, and the images of the frames, which have been subjected to the verification processing, can be read in the fine scan and output as finished prints in parallel with each other after the completion of the prescan before the verification processing step is not yet completed to all the frames, whereby the job efficiency and the processing capability of the operator can be greatly improved from the prescan to the output of the prints.

According to still another embodiment of the present invention, the information of the film reading surface is obtained by a film front and back side detecting device and the two-face inversion processing and the one-face inversion processing of the image data are carried out when necessary so that the film can be set without taking the front side and the back side of the film into consideration when the images are read.

According to yet another embodiment of the present invention, the simpler image reading apparatus and the simpler image processing apparatus can be produced because the frames are subjected to the prescan, the image processing, the verification processing and the fine scan processing in the same sequence.

What is claimed is:

1. An image reading method in which a film having images recorded in a plurality of frames in a longitudinal direction is transported to read the images in said plurality of frames photoelectrically at an image reading position by an image reading device, comprising the steps of:

transporting said film in a first direction along a read and transport path including said image reading position to perform a first image reading for reading the images in said plurality of frames by said image reading device;

returning a forward end of said film to said read and transport path on an entry or exit side of said read and transport path after said first image reading has been finished; and transporting said film along said read and transport path in said first direction or in a second direction opposite to said first direction to perform a second image reading in which the images in said plurality of frames are read by said image reading device at said image reading position in a sequence of frames that was applied to said first image reading, wherein returning the forward end of said film comprises transporting the forward end through a path not containing the image reading position.

2. The image reading method according to claim 1, wherein said first image reading is a prescan for reading the images in said plurality of frames of said film with low resolution, and said second image reading is a fine scan for reading the images in said plurality of frames of said film with high resolution.

3. The image reading method according to claim 1, wherein said first image reading is performed for determining a frame position of each of the images in said plurality of frames and reading conditions for said second image reading.

4. The image reading method according to claim 1, wherein said first image reading is performed for determining image processing conditions.

5. The image reading method according to claim 1, wherein said second image reading is performed for obtaining output image data.

6. The image reading method according to claim 1 wherein, after said first image reading has been finished, the forward end of said film is held at a specified position and said film is temporarily reserved in a specified space and wherein said film is returned to said read and transport path on the entry or exit side of said read and transport path after all of the images in said plurality of frames of said film have been subjected to said first image reading.

7. The image reading method according to claim 1, wherein said film is transported along a loop-shaped transport path so that the forward end of said film after said first image reading has been finished can be returned to said read and transport path on the entry or exit side of said read and transport path.

8. The image reading method according to claim 1 wherein the forward end of said film after said first image reading has been finished is returned to said read and transport path on the exit side of said read and transport path and wherein said film is transported along said read and transport path in said second direction to be subjected to said second image reading.

9. The image reading method according to claim 8, wherein, in said second image reading, the images in said plurality of frames of said film are read from a film surface opposite to that subjected to said first image reading.

10. The image reading method according to claim 8, wherein the forward end of said film after said first image reading has been finished is returned to said read and transport path on the exit side of said read and transport path after film surfaces have been reversed to each other and wherein, said second image reading, the images in said plurality of frames of said film are read from a film surface identical to that subjected to said first image reading.

11. The image reading method according to claim 8, wherein at least one of first image data obtained by said first image reading and second image data obtained by said second image reading is subjected to at least one processing of two-face inversion processing and one-face inversion processing where it is necessary to perform said at least one processing on a film surface captured in each of the first image reading and the second image reading.

12. The image reading method according to claim 11, wherein said first image data is not subjected to said two-face inversion processing or said one-face inversion processing and wherein image processing conditions determined based on said first image data include information as to whether or not each of said two-face inversion processing and said one-face inversion processing is necessary so that said second image data can be subjected to the at least one processing of said two-face inversion processing and said one-face inversion processing based on the image processing conditions when said at least one processing is necessary.

13. The image reading method according to claim 8, wherein from which surface side said film was read is detected in at least one of said first image reading and said second image reading and wherein, depending on which surface side was detected, it is determined whether or not at least one of first image data and second image data obtained by said first image reading and said second image reading, respectively requires each of two-face inversion processing and one-face inversion processing such that at least one processing of said two-face inversion processing and said one-face inversion processing can be performed when said at least one processing is necessary.

14. The image reading method according to claim 12, wherein a bar code recorded in the film is extracted to acquire bar code information thereby detecting from which surface side the film was read.

15. The image reading method according to claim 1, wherein the forward end of said film after said first image reading has been finished is returned to said read and transport path on the entry side of said read and transport path and wherein, in said second image reading, said film is transported along said read and transport path in said first direction and is read from a film surface identical to that subjected to said first image reading.

16. The image reading method according to claim 15, wherein said film is transported along a loop-shaped transport path so that the forward end of said film after said first image reading has been finished can be returned to said read and transport path on the entry side of said read and transport path.

17. The image reading method according to claim 16, wherein an optical path of projected light that reaches said image reading device from an illuminant for exposing said film is formed not so as to cross over said loop-shaped transport path when said film is photoelectrically read by said image reading device.

18. The image reading method according to claim 17, wherein the optical path of said projected light is changed in direction in mid course between said illuminant and said film.

19. The image reading method according to claim 17, wherein the optical path of said projected light is changed in direction in mid course between said film and said image reading device.

20. The image reading method according to claim 17, wherein the optical path of said projected light is straight.

21. The image reading method according to claim 20, wherein said loop-shaped transport path is formed so that said film can be twisted in mid course not to cross over the optical path of said projected light.

22. The image reading method according to claim 1, wherein, in said first image reading, said first image reading is performed and in parallel, a plurality of conditions including a frame position of each of the images in said plurality of frames, reading conditions for said second image reading and image processing conditions are corrected or determined, and wherein in correcting or determining the plurality of conditions, the plurality of conditions are not only corrected or determined but also said second image reading is performed in parallel based on the reading conditions for said second image reading that have been already determined.

23. An image reading method in which a film having images recorded in a plurality of frames in a longitudinal direction is transported to read the images in said plurality of frames photoelectrically at an image reading position by an image reading device, comprising the steps of:
transporting said film in a first direction along a read and transport path including said image reading position to perform a first image reading for reading the images in said plurality of frames by said image reading device; and performing one of a) and b),
wherein a) comprises returning a forward end of said film to said read and transport path on an exit side of said read and transport path after said first image reading has been finished; and transporting said film along said read and transport path in a second direction opposite to said first direction to perform a second image reading in which the images in said plurality of frames are read by said image reading device at said image reading position in a sequence of frames that was applied to said first image reading; and
wherein b) comprises returning a forward end of said film to said read and transport path on an entry side of said read and transport path after said first image reading has been finished; and transporting said film along said read and transport path in said first direction to perform a second image reading in which the images in said plurality of frames are read by said image reading device at said image reading position in a sequence of frames that was applied to said first image reading,
wherein returning the forward end of said film comprises transporting the forward end through a path not containing the image reading position.

24. An image reading method in which a film having images recorded in a plurality of frames in a longitudinal direction is transported to read the images in said plurality of frames photoelectrically at an image reading position by an image reading device, comprising the steps of:
transporting said film in a first direction along a read and transport path including said image reading position to perform a first image reading for reading the images in said plurality of frames by said image reading device;
returning a forward end of said film to said read and transport path on an entry or exit side of said read and transport path after said first image reading has been finished; and
transporting said film along said read and transport path in said first direction or in a second direction opposite to said first direction to perform a second image reading in which the images in said plurality of frames are read by said image reading device at said image reading position in a sequence of frames that was applied to said first image reading,
wherein returning the forward end of said film comprises transporting the forward end on a path differing from physical location of said read and transport path.

25. An image reading method in which a film having images recorded in a plurality of frames in a longitudinal direction is transported to read the images in said plurality of frames photoelectrically at an image reading position by an image reading device, comprising the steps of:
transporting said film in .a first direction along a read and transport path including said image reading position to perform a first image reading for reading the images in said plurality of frames by said image reading device; and performing one of a) and b),
wherein a) comprises returning a forward end of said film to said read and transport path on an exit side of said read and transport path after said first image reading has been finished; and transporting said film along said read and transport path in a second direction opposite to said first direction to perform a second image reading in which the images in said plurality of frames are read by said image reading device at said image reading position in a sequence of frames that was applied to said first image reading; and
wherein b) comprises returning a forward end of said film to said read and transport pat on an entry side of said read and transport path after said first image reading has been finished; and transporting said film along said read and transport path in said first direction to perform a second image reading in which the images in said plurality of frames are read by said image reading device at said image reading position in a sequence of frames that was applied to said first image reading,
wherein returning the forward end of said film comprises transporting the forward end on a path differing from physical location of said read and transport path.

* * * * *